United States Patent Office 3,770,731
Patented Nov. 6, 1973

3,770,731
N-s-TRIAZINE PERFLUOROALKYLMONOCAR-BOXYLIC ACID ESTERS
Horst Jaeger, Bettingen, Switzerland, assignor to Ciba-Geigy AG, Basel, Switzerland
No Drawing. Original application Dec. 4, 1970, Ser. No. 95,340. Divided and this application Sept. 6, 1972, Ser. No. 286,796
Int. Cl. C07d 55/38
U.S. Cl. 260—248 NS                     10 Claims (1) 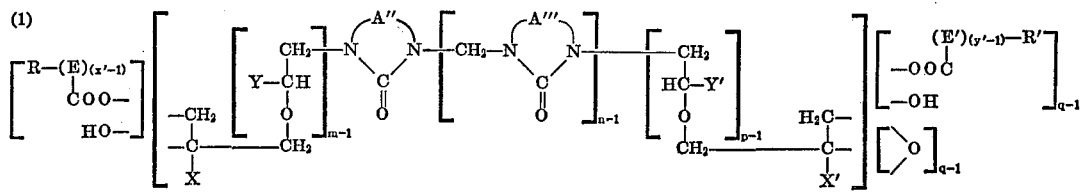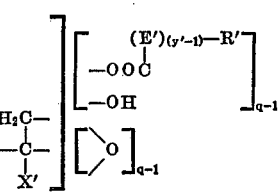

ABSTRACT OF THE DISCLOSURE

Perfluoroalkylmonocarboxylic acid esters from N-heterocyclic epoxides are provided. These esters contain a perfluoro alkyl radical, which is bonded directly or via an alkylene group with 1 to 10 carbon atoms to a carboxyl group. This carboxyl group is bonded in an ester-like manner to an acyclic, aliphatic radical substituted in the 2-position to the ester bridge by a free, etherified or esterified hydroxyl group. This letter radical being bonded to a ring nitrogen atom of a N-heterocyclic radical, which in turn at least by its second ring nitrogen atom is bonded to an acyclic aliphatic radical which contains an epoxide group in the terminal position or is linked to an acyclic aliphatic radical which is in turn bonded in an ester-like manner to a perfluoroalkyl radical. These fluoro compounds are manufactured from the corresponding perfluoroalkylcarboxylic acids and epoxides and are used for finishing of porous and non-porous substrates, especially for producing oleophobic finishes on textiles.

(2) 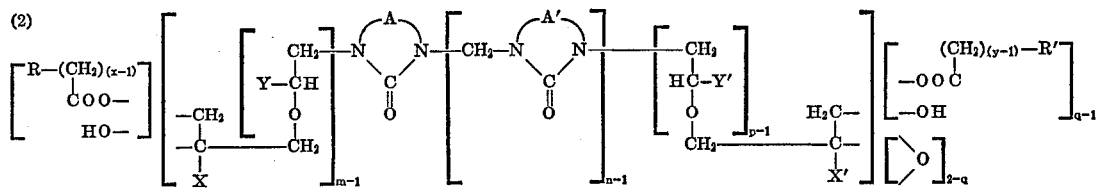

CROSS-REFERENCES TO RELATED APPLICATIONS

This is a division of application Ser. No. 95,340, filed Dec. 4, 1970.

The invention provides perfluoroalkylmonocarboxylic acid esters that (a) contain at least one perfluoroalkyl radical with 4 to 14 carbon atoms which is bonded directly or via an alkylene group with 1 to 10 carbon atoms to a carboxyl group, which is bonded in an ester-like manner to (b) an acyclic, aliphatic radical substituted in the 2-position to the ester bridge by an optionally etherified or esterified hydroxyl group, the radical being bonded to (c) a ring nitrogen atom of a 6-membered N-heterocyclic radical containing three ring nitrogen atoms, this heterocyclic radical being in turn bonded, at least by its second ring nitrogen atom, (1) to an acyclic aliphatic radical which contains an epoxide group in the terminal position or (2) linked to a radical as defined under (b), which is in turn bonded in an ester-like manner to a radical as defined under (a).

The alkylene group via which the perfluoroalkyl radical can be bonded to the carboxyl group can be linear or cyclic. Thus one is concerned, for example, with cycloalkylene radicals with 5 or 6 ring carbon atoms, such as the cyclohexylene radical, or especially with n-alkylene radcials with 1 to 10 carbon atoms.

The perfluoroalkylmonocarboxylic acid esters preferably correspond to the formula

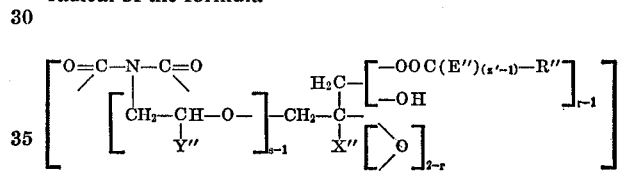

wherein R and R' each represent a perfluoroalkyl radical with 4 to 14 carbon atoms, E and E' each represent a cycloalkylene radical with 5 or 6 ring carbon atoms or an n-alkylene radical with 1 to 10 carbon atoms, X and X' each represent a methyl group or preferably a hydrogen atom, Y and Y' each represent a hydrogen atom or preferably a methyl group, A" and A'" each represent a radical of the formula

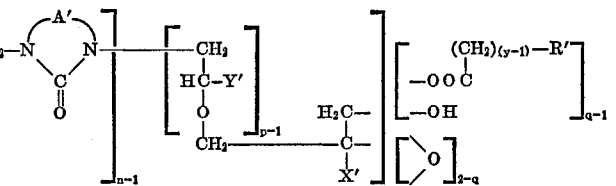

wherein R", E", X" and Y" have the meaning indicated for R, E, X and Y and $m$, $n$, $p$, $q$, $r$, $s$, $x'$, $y'$ and $z'$ each are 1 or 2.

Preferably, the perfluoroalkylmonocarboxylic acid esters correspond to the formula

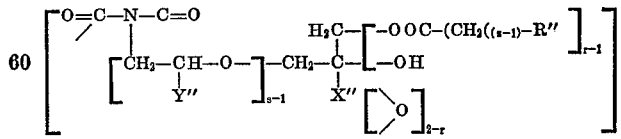

wherein R, R', X, X', Y, Y', $m$, $n$, $p$ and $q$ have the indicated meaning, A and A' each denote a radical of the formula

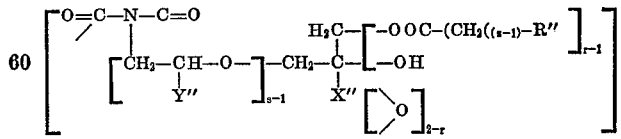

and $x$, $y$ and $z$ each denote an integer having a value of 1 to 11 and R", Y" and X" and $r$ and $s$ have the indicated meaning.

Where $q$ is 2, the compounds of Formula 1 are N-heterocyclic esters with at least two perfluoroalkylmonocarboxylic acid groups, and if $q$ is 1, the compounds are esters with at least one perfluoroalkylmonocarboxylic acid group.

The compound of Formula 1 can contain yet further perfluoroalkylmonocarboxylic acid esters, provided $r$ is 2.

$x$, $y$ and $z$ are preferably integers having a value of 1 to 3, or especially 1.

If $x$, $y$ and $z$ are greater than 1, they preferably represent integers having a value of 3 to 5.

Particular interest attaches to perfluoroalkylmonocarboxylic acid esters of the formula (3)
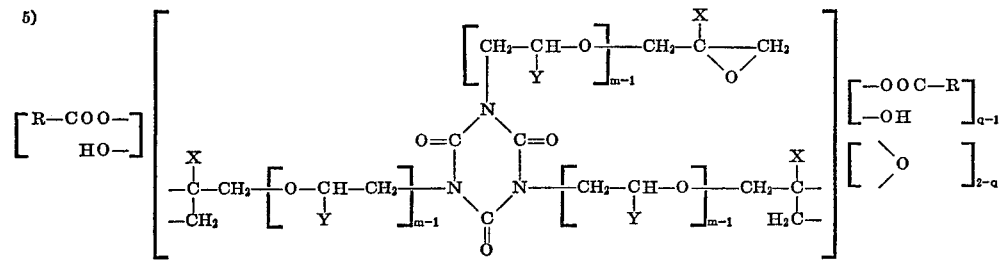

wherein R, X, Y, A, A', $m$ $n$ and $q$ have the meaning indicated.

Suitable perfluoroalkylmonocarboxylic acid esters which are derived from s-triazines correspond to the formula 5)
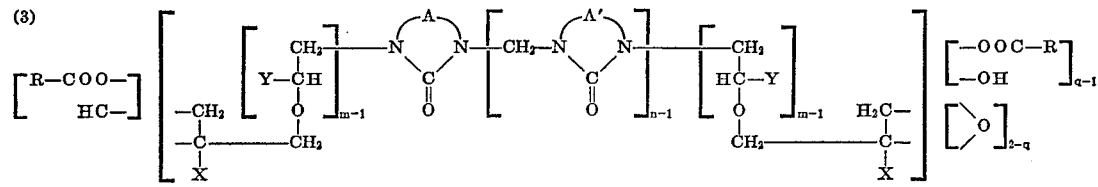

wherein R, X, Y and $m$ have the meaning indicated.

As in the case of the compounds of Formulae 2 and 3, Y here again preferably represents a methyl group and X a hydrogen atom.

The perfluoroalkyl radical of the perfluoroalkylmonocaboxylic acid esters according to the invention preferably contains 5 to 11, or especially 7 to 9, carbon atoms. The perfluoroalkyl radical can be either branched or unbranched, that is to say iso-perfluoroalkyl radicals, for example of the formula (9)
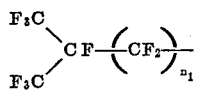

wherein $n_1$ represents an integer having a value of 1 to 11, can also be present. However, n-perfluoroalkyl radicals are always preferred. Further, the perfluoroalkyl radical can also be a ω-H-perfluoroalkyl radical which possesses a hydrogen atom in the terminal position.

The perfluoroalkylmonocarboxylic acid esters according to the invention are practically always isomer mixtures, in that they are manufactured from epoxides and on opening the epoxide ring the esterification with the corresponding perfluoroalkylmonocarboxylic acid can take place on either of the adjacent carbon atoms of the epoxide group.

As examples of perfluoroalkylmonocarboxylic acid esters according to the invention, the following compound may be quoted (for reasons of simplicity, only one isomeric form is given):

(10.9)
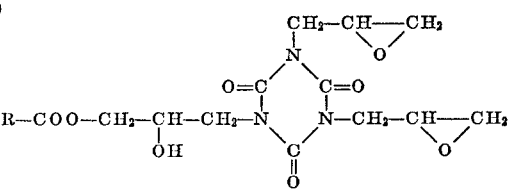

wherein R has the meaning indicated.

The perfluoroalkylmonocarboxylic acid esters according to the invention are appropriately manufactured according to methods which are in themselves known, by (1) reacting at least one perfluoroalkylmonocarboxylic acid with 4 to 14 carbon atoms in the perfluoroalkyl radical, which is bonded directly or via an alkylene bridge with 1 to 10 carbon atoms to the carboxyl group, with (2) at least one N-heterocyclic 6-membered epoxide containing three ring nitrogen atoms, which are each bonded to an epoxide group via an acyclic, aliphatic radical, and (3) subsequently optionally etherifying or esterifying the hydroxyl groups produced in this reaction with an alkanol or an alkylcarboxylic acid, respectively.

Depending on the molar ratio, compounds are thereby obtained which contain one, two or three perfluoroalkylmonocarboxylic acid esters in the molecule.

The reaction temperature is between 20 and 100° C., preferably between 20 and 70° C. To manufacture perfluoroalkylcarboxylic acid esters which possess an alkylene group between the perfluoroalkyl radical and the carboxyl group, it is advisable to carry out the process at 60 to 90° C. To manufacture corresponding compounds without an alkylene group, temperatures of 20 to 40° C. as a rule suffice. Depending on the reaction temperature and the reactivity of the reactants, the reaction takes 1 to 24 hours, but is in general complete after 4 to 8 hours. Preferably, the reaction is allowed to take place in the presence of a catalyst, such as for example anhydrous sodium acetate. The reaction is appropriately carried out in a solvent, such as for example ethyl acetate.

The new perfluoroalkylmonocarboxylic acid esters of Formula 1 are accordingly advantageously manufactured by reacting at least one perfluoroalkylmonocarboxylic acid of formula

(11)     R—(E)$_{(x'-1)}$—COOH as component (1) with an epoxide of formula

(12)
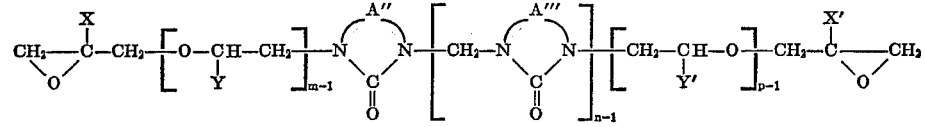

as component (2), wherein R, E, X, X', Y, Y', A'', A''', x', m, n and p have the indicated meaning.

Epoxides of Formulae 13 to 19 are used for the manufacture o fthe perfluoroalkylmonocarboxylic acid esters of Formulae 2 to 8.

(13)
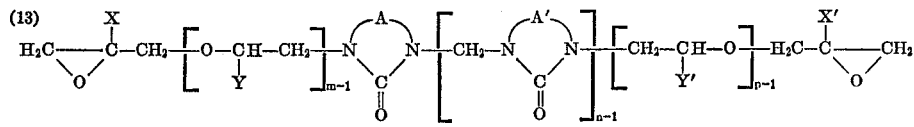

(14)
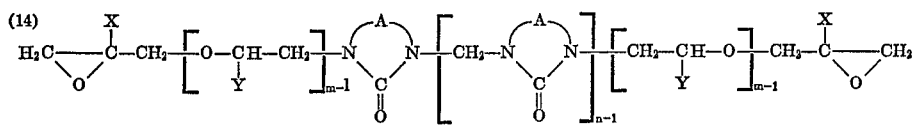

(16)
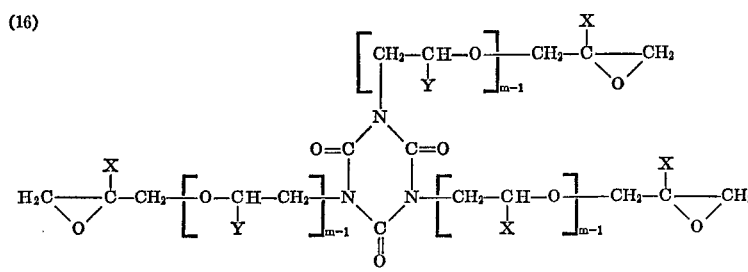

In these formulae, A, A', X, X', Y, Y', p, m and n have the meaning indicated.

The preparation of the particularly interesting perfluoroalkylmonocarboxylic acid esters of which the perfluoroalkyl radical contains 5 to 11, preferably 7 to 9, carbon atoms, is achieved by reacting a perfluoroalkylmonocarboxylic acid having 5 to 11, preferably 7 to 9, carbon atoms in the perfluoroalkyl radical, with the component (2). In Formula 10, x is preferably 1, 2 or 3, or especially 1.

Suitable epoxides for example correspond to the formulae (20.8)
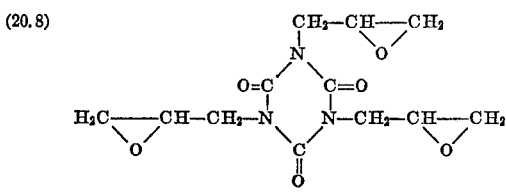

(20.9)
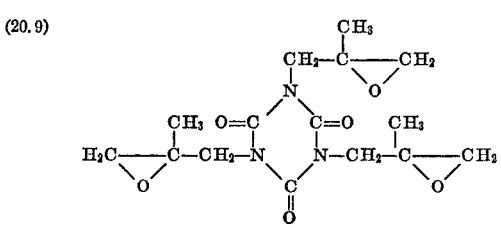

The epoxides used for the manufacture of the perfluoroalkylmonocarboxylic acid esters according to the invention are known and are manufactured according to methods which are in themselves known, by reacting the corresponding N-heterocyclic compound with an epihalogenohydrin, for example epichlorohydrin or β-methylepichlorohydrin.

As a result of the presence of free hydroxyl groups, the perfluoroalkylmonocarboxylic acid esters according to the invention react with compounds which contain several functional groups capable of reaction with hydroxyl groups, such as 1,2-epoxide groups, isocyanate groups, acrylyl groups, methylol groups, methylol groups etherified with lower alcohols, aldehyde groups, easily hydrolysable ester groups, amino groups and the like. Such polyfunctional compounds are, therefore, suitable for use as crosslinking components or curing components for the perfluoroalkylmonocarboxylic acid esters, according to the invention, that contain hydroxyl groups.

As such crosslinking components there may especially be mentioned:

Epoxide compounds, especially polyglycidyl ethers, such as butanediol diglycidyl ether and diglycidyl ether, diisocyanates and polyisocyanates, such as o-, m- and p-phenylenediisocyanate, toluylene-2,4-diisocyanate and 1,5-naphthylenediisocyanate; acrylyl compounds such as methylenebisacrylamide and symmetrical triacrylylperhydrotriazine; poly-(2,3-di-hydro-1,4-pyranyl) compounds, such as (2,3-dihydro-1',4'-pyran-2'-yl)-methyl ester; aldehydes, such as formaldehyde or glyoxal, and soluble phenolformaldehyde condensation products, such as novolaks or resols. Aminoplasts that are soluble in water or in organic solvents are preferably used as crosslinking components.

Possible aminoplasts are formaldehyde condensation products of urea, thiourea, guanidine, ethyleneurea, glyoxalmonourein, acetylenediurea and dicyandiamide, and also of aminotriazines, such as melamine, or of guanamines, such as acetoguanamine, benzoguanamine, tetrahydrobenzoguanamine or formoguanamine, as well as their ethers with alcohols, such as methyl, ethyl, propyl, allyl, butyl, amyl and hexyl alcohol, cyclohexanol, benzyl alcohol, lauryl alcohol, stearyl alcohol, oleyl alcohol or abietyl alcohol. In addition to the ether radicals, the condensation products can also contain radicals of higher-molecular acids, such as for example stearic acid.

Particularly good technical results in the field of textile finishing are obtained on using water-soluble condensation products of formaldehyde and melamine, or especially the esterification product or etherification product from hexamethanolmelamine-methyl-ethers and stearic acid or stearyl alcohol, as crosslinking components, for example hexamethanolmelamine-pentamethyl-ether, since an oleophobic effect and a hydrophobic effect can thus be simultaneously achieved. It is frequently also advantageous to employ the perfluoroalkylmonocarboxylic acid esters as precondensates with crosslinking agents, for example amines or aminoplast precondensates.

The perfluoroalkylmonocarboxylic acid esters can also be used as a mixture with polymers not containing fluorine. Polymers not containing fluorine which are very suitable are here, for example, the homopolymers of acrylic acid esters or methacrylic acid esters, such as poly (ethyl acrylate) or copolymers of acrylic acid esters or methacrylic acid esters with methylolacrylamide or methylolmethacrylamide.

The perfluoroalkylmonocarboxylic acid esters according to the invention can, by virtue of their reactive groupings, be used for the treatment of porous and non-porous substrates, preferably for producing oleophobic finishes thereon, it being possible to incorporate the esters into the material in question or above all to apply them to its surface. By porous substrates, leather or preferably fibre materials such as textiles and paper are to be understood; possible non-porous materials are plastics and above all surfaces of metals and glass.

The finishing of the substrate with the perfluoroalkyl-monocarboxylic acid esters according to the invention can be carried out in a process step by itself, but also in the same process step as the application of further finishing agents, for example together with known agents for imparting hydrophobic properties, such as paraffin emulsions, or solutions or emulsions of fatty acid condensation products, for example with aminoplast precondensates, and as mentioned above.

Further, a so-called "soil release" and "anti-soiling" effect can also be achieved with the perfluoro compounds according to the invention, especially on cotton.

At the same time as imparting oleophobic properties, these perfluoro compounds also show hydrophilic properties. For rendering oleophobic, the substrates can be treated either with solutions or with dispersions or emulsions of the perfluoro compounds. Perfluoroalkyl-monocarboxylic acid esters can, for example, also be applied to the textile material in a solution with an organic solvent, and be heat-fixed to the fabric after evaporation of the solvent.

Particular interest as regards finishing by means of the perfluoroalkylmonocarboxylic acid esters according to the invention attaches to textile materials. Examples of such materials include those from native or regenerated cellulose, such as cotton, linen or rayon, viscose staple, or cellulose acetate. However, textiles made of wool, synthetic polyamides, polyesters or polyacrylonitrile can also be used. Mixed woven fabrics or mixed knitted fabrics of cotton-polyester fibres can also advantageously be finished. The textiles can here be in the form of filaments, fibres or flocks, but perferably of woven fabrics or knitted fabrics.

Preparations which contain the perfluoro compound according to the invention can be applied to the substrate in the customary manner which is in itself known. Woven fabrics can for example be impregnated according to the exhaustion process, or on a padder which is fed with the preparation at room temperature. The impregnated material is thereafter dried at 60 to 120° C. and subsequently, where appropriate, also subjected to a heat treatment at above 100° C., for example at 120 to 200° C.

The textiles treated in this way as a rule show an oil-repellent aciton, and where the preparation also contains an agent for conferring hydrophobic properties, this action is coupled with a water-repellent action.

EXAMPLE 11

63.7 g. of an epoxide of the Formula(20.8) and 178 g. of perfluorocaprylic acid are dissolved in 400 ml. of ethyl acetate at room temperature, with the addition of 5 g. of anhydrous sodium acetate.

The temperature rises to 50° C., and the reaction temperature is kept constant at 30° C. After 9 hours' reaction the epoxide content is 88.8%, relative to one free epoxy group. The solution is filtered and concentrated in vacuo at 50° C. The residue is water-soluble and yields an amber-yellow, solid phase. Weight 276.4 g.=93.7% of theory.

Recording a mass spectrum confirms the structure, in that it shows a molecular weight of 1125, which corresponds to a product of the formula (XI)

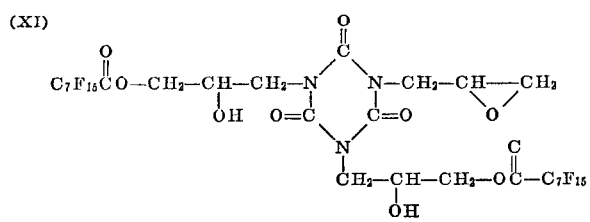

EXAMPLE 20

The following liquors are prepared with the substances manufactured according to the instructions in Example 11.

| Product from— | G | H |
|---|---|---|
| Example 11 | 10 | 20 |
| (¹) | 100 | 100 |
| AlCl₃×6H₂O | 4 | |
| MgCl₂ | | 10 |
| Water | 1,000 | 1,000 |

¹ 50% strength aqueous solution of hexamethylolmelamine-hexamethyl-ether and dimethylolethyleneurea.

Pieces of fabric of cotton-polyester, synthetic polyamide, polyester and wool gaberdine are successively dipped into these liquors and thus impregnated with the perfluoro compound.

The fabrics are thereafter dried for 5 minutes at 130° C.

The assessment of the oil-repellent effect is carried out according to the so-called "3M oil repellency test" (Crajech and Peterson, Textile Research Journal 32, pp. 320 to 331 (1960)) using heptane-Nujol mixtures. In the assessment, 150 denotes the best obtainable rating. The individual samples are assessed immediately after drying, that is to say as they are, and after washing in boiling trichloroethylene for 5 minutes. However, instead of washing with trichloroethylene, the fabrics are subjected to 1, 5 and 10 SNV-3 washes. At the same time, the polyester/cotton fabrics were also tested for their "soil release," again after 1, 5 and 10 SNV-3 washes. The test was here carried out according to the so-called "stain release test method" AATCC 130 (1969).

All fabrics proved to have simultaneously an olephobic and a hydrophilic finish.

| Substrate | G | H |
|---|---|---|
| Cotton as obtained | 110 | 110 |
| Cotton/polyester as obtained | 110 | 110 |

| Cotton/polyester | Soil release (Best rating=5) | |
|---|---|---|
| A. Nujol as obtained: | | |
| 1×SNV | 3.5 | 4 |
| 5×SNV | 2.5 | 2.5 |
| 10×SNV | 2 | 2.3 |
| B. Skin fat: | | |
| 1×SNV | 3.5 | 3 |
| 10×SNV | 3 | 3 |

I claim:

1. A perfluoroalkylmonocarboxylic acid ester characterised in that it corresponds to the formula

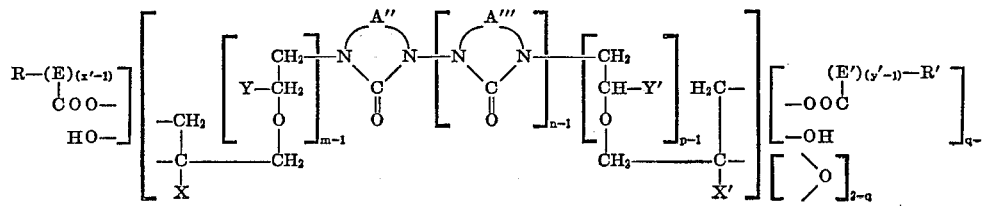

in which R and R' each represent a perfluoroalkyl radical with 4 to 14 carbon atoms, E and E' each represent a cycloalkyl radical with 5 to 6 ring carbon atoms or an n-alkyl radical with 1 to 10 carbon atoms, X, X', Y and Y' each represent hydrogen or methyl, A'' and A''' each represent a radical of the formula

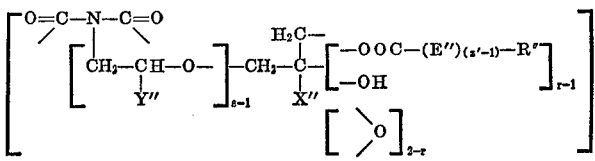

in which R'', E'', X'' and Y'' have the meaning indicated for R, E, X, and Y and $m, n, p, q, r, s, x', y'$ and $z'$ each are 1 or 2.

2. A perfluoroalkylmonocarboxylic acid ester according to claim 1, characterised in that it corresponds to the formula

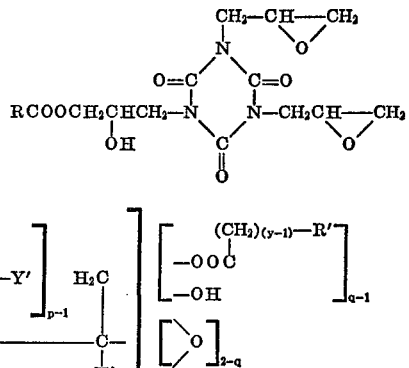

in which R, R', X, X', Y, Y', $m, n, p$ and $q$ have the meaning indicated in claim 1, A and A' each denote a radical of the formula

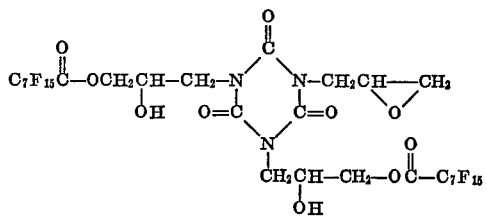

$x, y$, and $z$ each denote an integer having a value of 1 to 11, and R'', X'', Y'', $r$ and $s$ have the meaning indicated in claim 1.

3. A perfluoroalkylmonocarboxylic acid ester according to claim 2, characterised in that $x, y$ and $z$ are each equal to 1.

4. A perfluoroalkylmonocarboxylic acid ester according to claim 1, characterised in that it corresponds to the formula

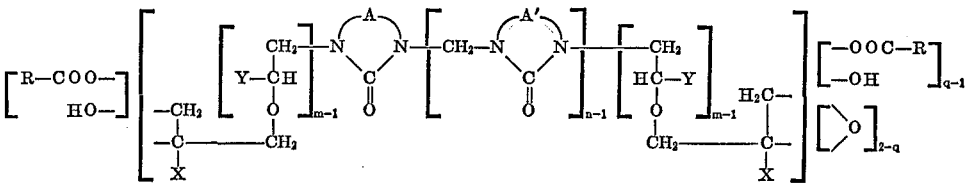

in which R, X, Y, A, A', $m, n,$ and $q$ have the meaning indicated in claim 2.

5. A perfluoroalkylmonocarboxylic acid ester according to claim 1, characterised in that it corresponds to the formula

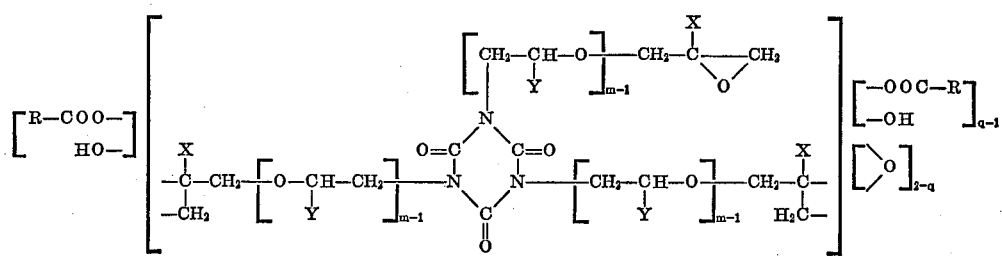

in which R, X, Y, $m$ and $q$ have the meaning indicated in claim 1.

6. A perfluoroalkylmonocarboxylic acid ester according to claim 1, characterised in that it corresponds to the formula

[formula]

in which R has the meaning indicated in claim 1.

7. A perfluoroalkylmonocarboxylic acid ester according to claim 1, characterised in that the perfluoroalkyl radicals contain 5 to 11 carbon atoms.

8. A perfluoroalkylmonocarboxylic acid ester according to claim 1, characterised in that the perfluoroalkyl radicals contain 7 to 9 carbon atoms.

9. The perfluoroalkylmonocarboxylic acid ester according to claim 1 of the formula

[formula]

10. Process for the manufacture of perfluoroalkylmonocarboxylic acid esters according to claim 1, which comprises reacting (1) at least one perfluoroalkylmonocarboxylic acid with 4 to 14 carbon atoms in the perfluoroalkyl radical, which is bonded directly or via an alkylene bridge with 1 to 10 carbon atoms to the carboxyl group with (2) at least one epoxide of the formula

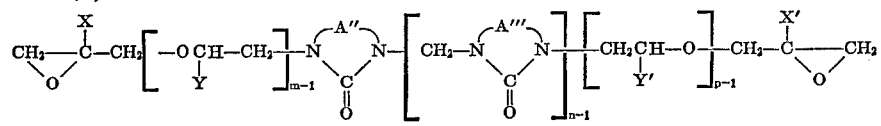

wherein R, X, X', Y, Y', A'', A''', m, n and p have the meaning indicated in claim 1, and (3) the hydroxyl groups produced in this reaction are subsequently optionally etherified or esterified with an alkanol or an alkylcarboxylic acid, respectively.

References Cited
UNITED STATES PATENTS
3,658,801  4/1972  Berry et al. _____ 260—248

JOHN M. FORD, Primary Examiner

U.S. Cl. X.R.

252—8.8; 117—161

UNITED STATES PATENT OFFICE
CERTIFICATE OF CORRECTION

Patent No. 3,770,731    Dated November 6, 1973

Inventor(s) Horst Jaeger

It is certified that error appears in the above-identified patent and that said Letters Patent are hereby corrected as shown below:

Column 1, page 1 - under Ser. No. 286,796 insert -- Claims priority, application Switzerland,

December 10, 1969, 18400/69
February 9, 1970, 1827/70 --

Signed and sealed this 27th day of August 1974.

(SEAL)
Attest:

McCOY M. GIBSON, JR.
Attesting Officer

C. MARSHALL DANN
Commissioner of Patents